(12) United States Patent
Korol

(10) Patent No.: US 11,260,601 B2
(45) Date of Patent: Mar. 1, 2022

(54) SYSTEM FOR PRINTING BINDING AGENTS

(71) Applicant: BRILL, INC., Tucker, GA (US)

(72) Inventor: Steven Van Cleve Korol, Boise, ID (US)

(73) Assignee: BRILL, INC., Tucker, GA (US)

( * ) Notice: Subject to any disclaimer, the term of this patent is extended or adjusted under 35 U.S.C. 154(b) by 39 days.

(21) Appl. No.: 16/839,117

(22) Filed: Apr. 3, 2020

(65) Prior Publication Data
US 2020/0331208 A1 Oct. 22, 2020

Related U.S. Application Data

(60) Provisional application No. 62/834,437, filed on Apr. 16, 2019.

(51) Int. Cl.
| | | |
|---|---|---|
| *B29C 64/393* | (2017.01) | |
| *B33Y 10/00* | (2015.01) | |
| *B29C 64/209* | (2017.01) | |
| *B33Y 50/02* | (2015.01) | |
| *B29C 64/165* | (2017.01) | |
| *B33Y 30/00* | (2015.01) | |

(52) U.S. Cl.
CPC .......... *B29C 64/393* (2017.08); *B29C 64/165* (2017.08); *B29C 64/209* (2017.08); *B33Y 10/00* (2014.12); *B33Y 30/00* (2014.12); *B33Y 50/02* (2014.12)

(58) Field of Classification Search
CPC ... B29C 64/393; B29C 64/209; B29C 64/165; B33Y 10/00; B33Y 30/00; B33Y 50/02
See application file for complete search history.

(56) References Cited

U.S. PATENT DOCUMENTS

| | | | |
|---|---|---|---|
| 2017/0057161 A1* | 3/2017 | Kuk | B33Y 30/00 |
| 2017/0319746 A1* | 11/2017 | Lutolf | C12M 29/10 |
| 2018/0201019 A1* | 7/2018 | Seto | B41J 2/18 |
| 2018/0264717 A1* | 9/2018 | Sugiura | B29C 64/227 |
| 2018/0264731 A1* | 9/2018 | Kritchman | B29C 64/106 |
| 2018/0320009 A1* | 11/2018 | Ganapathiappan | B29C 64/165 |
| 2019/0202206 A1* | 7/2019 | Ge | B29C 64/209 |
| 2020/0189265 A1* | 6/2020 | Gardner | B33Y 30/00 |
| 2021/0008788 A1* | 1/2021 | Murphy | C12M 41/00 |
| 2021/0008793 A1* | 1/2021 | Pokrass | B29C 64/277 |

* cited by examiner

*Primary Examiner* — Yung-Sheng M Tsui
(74) *Attorney, Agent, or Firm* — Bryan Cave Leighton Paisner LLP

(57) ABSTRACT

A system for fabricating a three-dimensional article includes a fluid supply with binding agent, a printhead, a powder dispenser, and a controller. The fluid supply is for containing a binding agent. The controller is configured to (a) operate the fluid supply and/or the printhead to elevate a temperature of the binding agent to above 25 degrees Celsius, (b) operate the dispenser to dispose a layer of the powder at a build plane, (c) scan and operate the printhead to selectively jet the binding agent onto the layer of powder to bind a layer of the three-dimensional article, and (d) repeat operating the dispenser and scanning and operating the printhead to complete fabrication of the article. Jetting or not jetting the binding agent includes individually operating drop ejectors of the printhead using a voltage waveform. The waveform can include one or more of a non-ejecting pulse and an ejecting pulse.

20 Claims, 4 Drawing Sheets

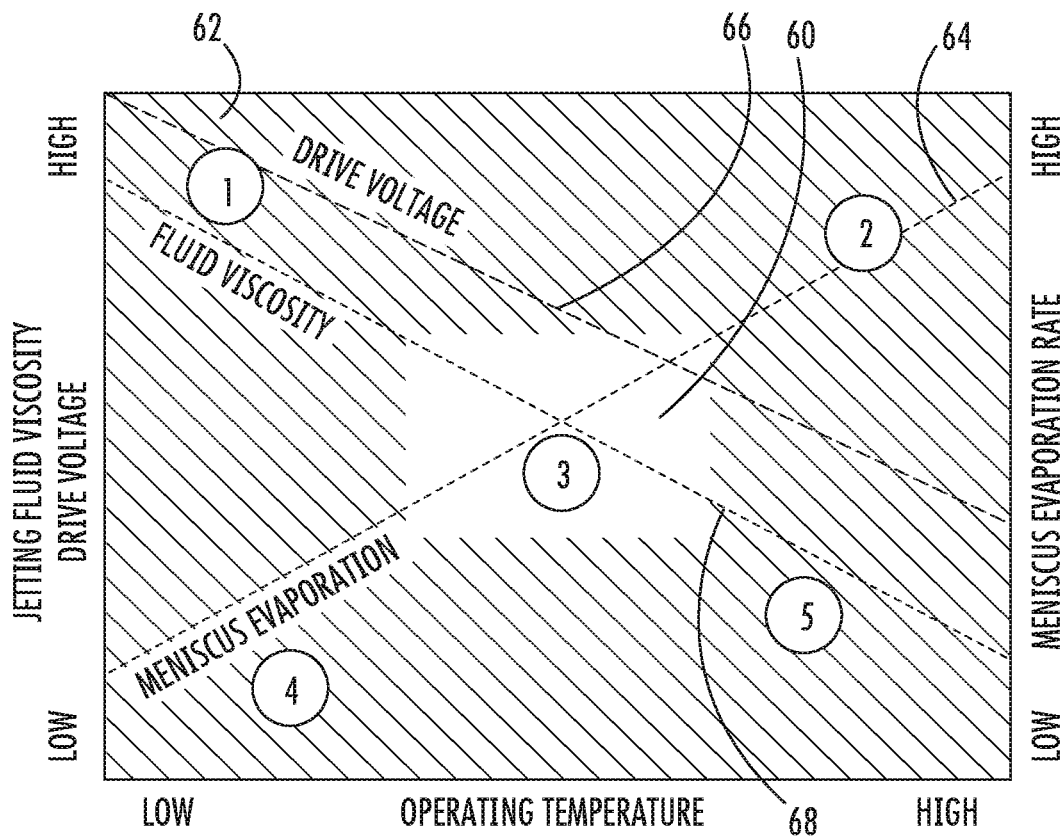

DESCRIPTION OF THE CONDITIONS IN THE VARIOUS SUBREGIONS:

1. FLUID VISCOSITY AND VOLTAGE REQUIREMENT TOO HIGH.
2. FLUID VISCOSITY, VOLTAGE REQUIREMENT, AND MENISCUS EVAPORATION RATE TOO HIGH.
3. CONDITIONS "JUST RIGHT" FOR GOOD JETTING.
4. FLUID VISCOSITY TOO LOW.
5. FLUID VISCOSITY TOO LOW AND MENISCUS EVAPORATION RATE TOO HIGH.

- IF VISCOSITY IS TOO LOW, FLUID WILL NOT BE "PUMPED" BY THE EJECTOR.
- IS VISCOSITY IS TOO HIGH, VOLTAGE REQUIREMENT IS TOO HIGH AND/OR INTERNAL PASSAGES WITHIN THE PRINTHEAD ARE TOO RESTRICTIVE FOR JETTING.
- IF TEMPERATURE IS TOO HIGH MENISCUS EVAPORATION CAUSES NOZZLE CLOGGING.

FIG. 4

SYSTEM FOR PRINTING BINDING AGENTS

CROSS-REFERENCE TO RELATED APPLICATIONS

This non-provisional patent application claims priority to U.S. Provisional Application Ser. No. 62/834,437, Entitled "System for Printing Binding Agents" by Steven Van Cleve Korol, filed on Apr. 16, 2019, incorporated herein by reference under the benefit of U.S.C. 119(e).

FIELD OF THE INVENTION

The present disclosure relates to a layer-by-layer fabrication of a three-dimensional article by alternating dispensing powder layers and selectively dispensing a binding agent. More particularly, the present disclosure concerns unique operating conditions that enable the use certain adhesive binding agents.

BACKGROUND

Three-dimensional printing systems are in wide use for fabricating three-dimensional articles with metals, plastics, ceramics, composites, and other materials. One major type of three-dimensional printing technology utilizes a dry powder and a liquid binding agent. The basic process is a repeated layer-by-layer dispensing of a uniform powder layer followed by a selectively dispensed binding agent. The selective dispensing of the binding agent determines a cross-section of the article for a given layer.

The binding agent that is used typically provides a matrix that binds together the particles. In some systems, the binding agent can react with or partially dissolve the particles. Some of these binding agents are challenging to dispense with enough precision and reliably. This is particularly true for binding agents that include dissolved solids.

BRIEF DESCRIPTION OF THE FIGURES

FIG. 4 is a graphical representation of an "operating window" for printing binding agents.

SUMMARY

Figure 1:
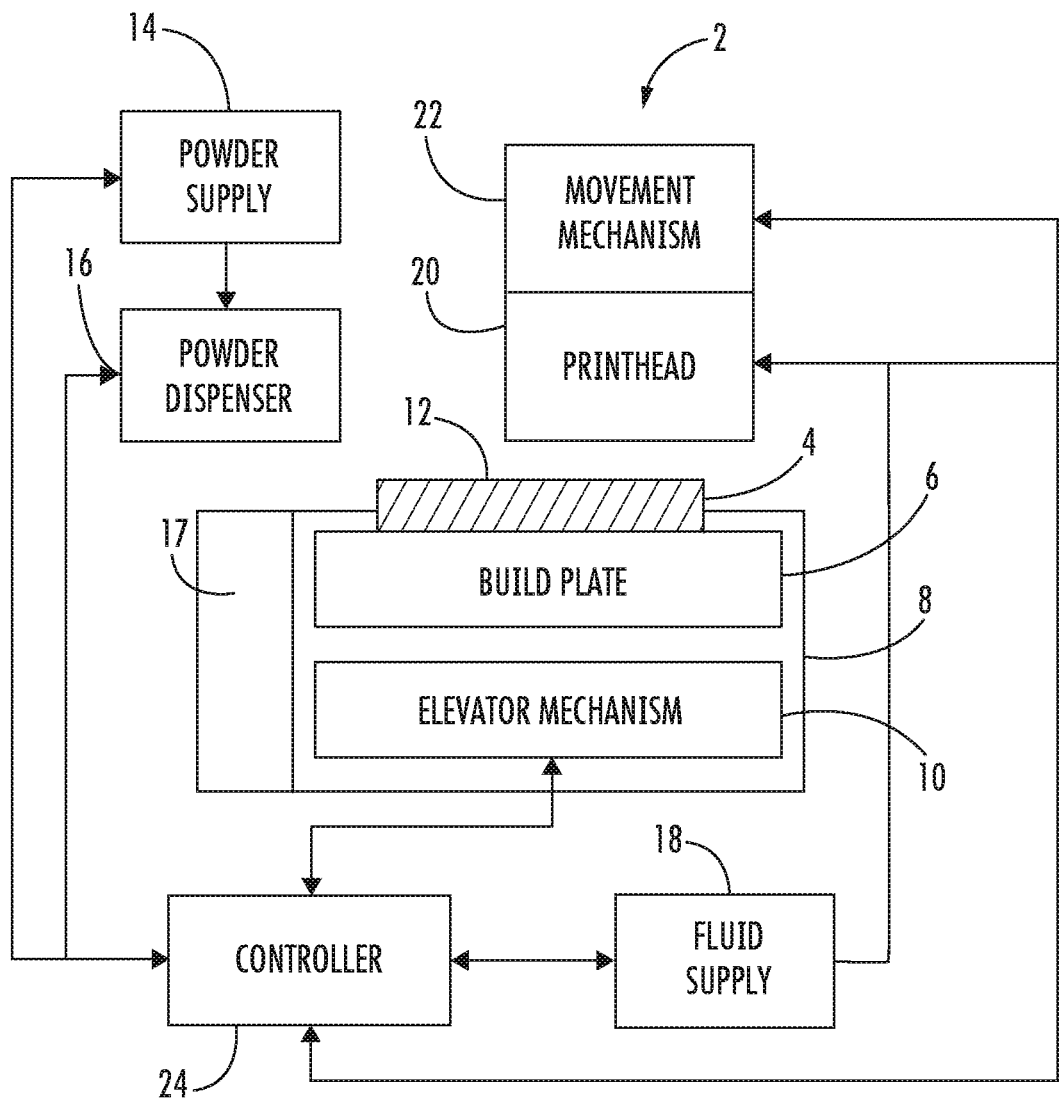
FIG. 1 is a block diagram schematic of a three-dimensional printing system for printing a three-dimensional article using a powder and binding agent.

In a first aspect of the disclosure, a system for fabricating a three-dimensional article includes a fluid supply, a printhead, a dispenser, and a controller. The fluid supply is for containing a binding agent. The printhead is a drop-on-demand fluid-jetting piezoelectric printhead configured to receive the binding agent from the fluid supply. The dispenser is for dispensing layers of powder. The controller is configured to (a) operate the fluid supply and/or the printhead to elevate a temperature of the binding agent to above 25 degrees Celsius, (b) operate the dispenser to dispose a layer of the powder at a build plane, (c) scan and operate the printhead to selectively jet the binding agent onto the layer of powder to bind a layer of the three-dimensional article, and (d) repeat operating the dispenser and scanning and operating the printhead to complete fabrication of the article. Selectively jetting the binding agent includes individually operating drop ejectors of the printhead using a plurality of voltage waveforms. The voltage waveforms individually include one or more of a non-ejecting pulse and an ejecting pulse. The non-ejecting pulse has a peak voltage of magnitude V1 and duration T1. The ejecting pulse has at least two sequential pulses including a positive pulse followed by a negative pulse. The positive pulse has a peak voltage of magnitude V2 and duration T2. V2 is more than three times V1. The negative pulse has a peak voltage of magnitude V3 and duration T3. V3 is more than three times V1.

In one implementation the controller is configured to maintain the binding agent temperature within a range of 25 to 40 degrees Celsius. More particularly, the range is 25 to 35 degrees Celsius. Yet more particularly, the range is 29 to 35 degrees Celsius or about 32 degrees Celsius.

In another implementation the ejected drop has a drop volume in a range of 15 to 25 picoliters. The drops can be ejected with a frequency in a range of 15 to 40 KHz.

In yet another implementation the non-ejecting pulse has a negative polarity, the positive pulse has a positive polarity, and the negative pulse has a negative polarity. The ejecting pulse has a time duration of at least two times that of the non-ejecting pulse. Also, T2>T3.

In a further implementation V1 is within a range of 8 to 12 volts. T1 is within a range of 3 to 5 microseconds.

In a yet further implementation, V2 is within a range of 30 to 50 volts. T2 is within a range of 6 to 9 microseconds.

In another implementation, V3 is within a range of 30 to 50 volts. T3 is within a range of 3 to 5 microseconds.

In yet another implementation, the plurality of waveforms individually have two different modes including a non-ejecting mode and an ejecting mode. The non-ejecting mode waveform includes the non-ejecting pulse but not the ejecting pulse. The ejecting mode waveform includes the ejecting pulse but not the non-ejecting pulse.

In a further implementation, the plurality of waveforms individually have two different modes including a non-ejecting mode and an ejecting mode. The non-ejecting mode waveform includes the non-ejecting pulse but not the ejecting pulse. The ejecting mode waveform includes the both ejecting pulse and the non-ejecting pulse. Within the ejecting mode waveform, the non-ejecting pulse an temporally be before or after the ejecting pulse.

In a yet further implementation, an idle time period $T_i$ is defined as a time during which a drop ejector does not receive a waveform. During the idle time period $T_i$, the drop ejector does not receive either one of a non-ejecting pulse and an ejecting pulse. The idle time period $T_i$ is less than 180 seconds. Preferably, the idle time period $T_i$ is less than 120 seconds. Yet more preferably, the idle time period is less than 60 seconds. To maximize reliability of the drop ejectors, the idle time period $T_i$ is no more than 30 seconds.

In a second aspect of the disclosure, a method of fabricating a three-dimensional article includes the following steps: (A) preheating a binding agent to at least 25 degrees Celsius; (B) depositing a layer of powder upon a surface; (C) scanning a piezoelectric printhead over the layer of powder; (D) concurrent with scanning the piezoelectric printhead, applying a plurality of waveforms to drop ejectors to selectively eject drops of the preheated binding agent onto the layer of powder; (E) repeating deposition of the powder and scanning and operating the printhead to complete fabrication of the article. The waveforms include: (1) a non-ejecting pulse having a peak voltage of magnitude V1 and duration T1; (2) an ejecting pulse having at least two sequential pulses. The two sequential pulses include: (a) a positive pulse having a peak voltage of magnitude V2 and duration T2; V2 is more than three times V1; (b) a negative pulse having a peak voltage of magnitude V3 and duration T3; V3 is more than three times V1.

DETAILED DESCRIPTION OF THE PREFERRED EMBODIMENTS

FIG. 1 is a block diagram schematic of a three-dimensional printing system 2 for printing a three-dimensional article 4. A build plate 4 is for supporting the three-dimensional article 4 within a build volume container 8. An elevator mechanism 10 is configured to controllably adjust a vertical position of the build plate 6 and also an upper surface 12 of either the build plate 6 or article 4 for dispensing and forming layers onto the article 4.

A supply of powder 14 is configured to provide the powder to a powder dispenser 16. The powder dispenser 16 is configured to controllably dispense layers of the powder onto the upper surface 12. The build volume container 8 includes an overflow chamber 17 for receiving excess powder during a powder dispensing operation.

A fluid supply 18 is configured to supply a binding agent to a printhead 20. The printhead 20 is a drop-on-demand fluid-jetting printhead 20. In an illustrative embodiment, the fluid jetting printhead 20 is a piezoelectric printhead with a plurality of drop ejectors. A movement mechanism 22 is configured to impart a lateral motion along two axes between the printhead 20 and the upper surface 12.

A controller 24 is coupled to various portions of the system 2 including the elevator mechanism 10, the powder supply 14, the powder dispenser 16, the fluid supply 18, the printhead 20, the movement mechanism 22, and other portions of system 2. The controller 24 includes a processor coupled to an information storage device. The information storage device includes a non-transient or non-volatile portion storing software instructions. When executed, the software instructions control the portions of the system 2 listed supra. The controller 24 can be a single computer integrated into system 2 or it can include more than one coupled computer including a host computer.

Figure 2:
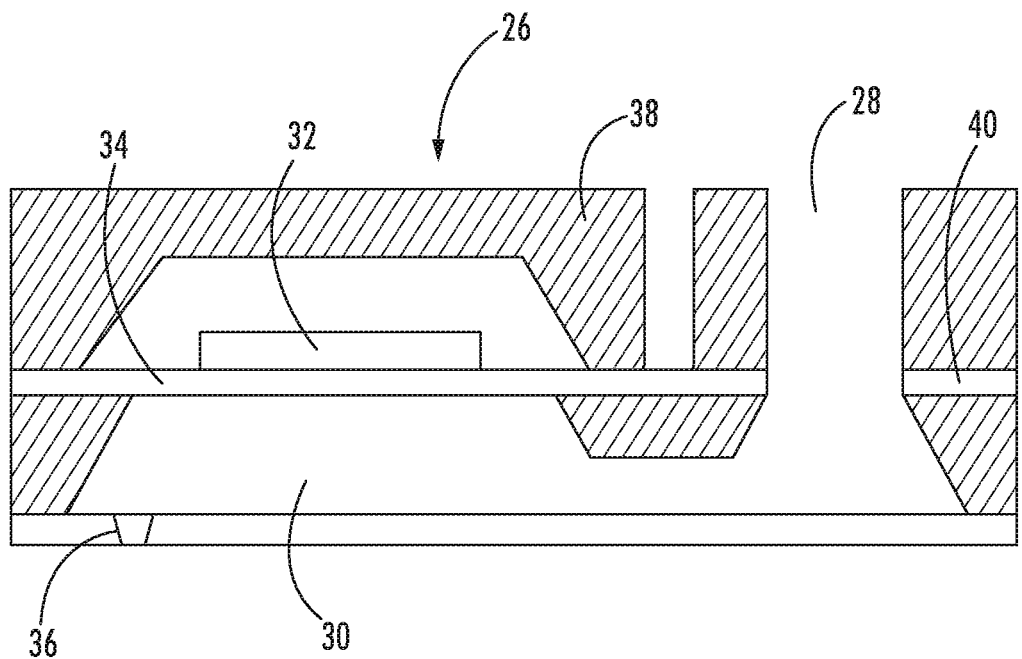
FIG. 2 is a schematic illustration of an embodiment of a piezoelectric drop ejector.

FIG. 2 is a schematic illustration of an embodiment of a piezoelectric drop ejector 26 that can be a portion of printhead 20. Ejector 26 includes a fluid manifold 28 that supplies the (fluid) binding agent to an array of pressure chambers 30, one of which is illustrated in cross section. A piezoelectric element 32 is coupled to a thin membrane 34. The piezoelectric element 32 changes dimension in response to receiving an electrical pulse and, in doing so, flexes the thin film membrane 34. Flexing of membrane 34 transiently generates a pressure pulse within chamber 30 thereby ejecting a droplet of fluid binding agent out of nozzle 36. In this illustrative embodiment, the piezoelectric drop ejector 26 can be formed from etched silicon 38 and deposited thin films 40 of metal, glass, and ceramic. In other embodiments, a piezoelectric drop emitter 26 can be formed from laminated layers of metal and glass. In some embodiments, the piezoelectric drop ejector 26 can be formed from layered stainless steel plates.

An example of a piezoelectric printhead is a Xerox® "M-Series Industrial Inkjet Jetstack". The Jetstack printheads are at least partially formed from layers of stainless steel and are compatible with a wide range of chemistries.

In various embodiments, the powder supply 14 (FIG. 1) contains an edible powder. The edible powder can include one or more of granular sugar, powdered sugar, flour, meringue powder, and other powdery materials. In a particular embodiment, the powder contains a substantial amount of sugar or at least 50% sugar by weight.

In various embodiments, the fluid supply 18 can contain an edible binding agent that can at least partially dissolve the edible powder. The binding agent can be more than 50% water by weight and can include a co-solvent such as alcohol. In some embodiments the water can be more than 60% or more than 70% by weight. Other constituents can include one or more of a colorant, dissolved solids, a humectant, a surfactant, and an acid. The fluid supply 18 and printhead 20 can eject a plurality of binding agents having different colors. The colors can include cyan, magenta, yellow, black, and white to provide a "process color." The dyes can include red, blue, green, and orange to expand a color range. The colors can also include spot colors for particular applications. The colors are provided by a colorant such as a dye.

In an embodiment, the edible binding agent has a viscosity in a range of 2 to 8 centipoise within a temperature range of 25 degrees Celsius to 40 degrees Celsius. In a more particular embodiment the viscosity is in a range of 2.5 to 7.0 centipoise at 25 degrees Celsius and is in a range of 2.2 to 5.5 centipoise at 30 degrees Celsius. In a yet more particular embodiment, the viscosity can be about 4.75 centipoise at a temperature of 30 degrees Celsius. The disclosed viscosities infra and supra can be based on measurements with a Brookfield viscometer operated at 50 revolutions per minute (RPM).

In other embodiments, the powder can also be an inedible material. The binding agent can then function as an adhesive that provides a matrix for binding the powder. In an illustrative embodiment, the powder is either at least partially soluble in the binding agent or chemically reactive with the binding agent to improve cohesion of a resultant fabricated article formed therefrom. The binding agent can include dissolved solids.

Figure 3:
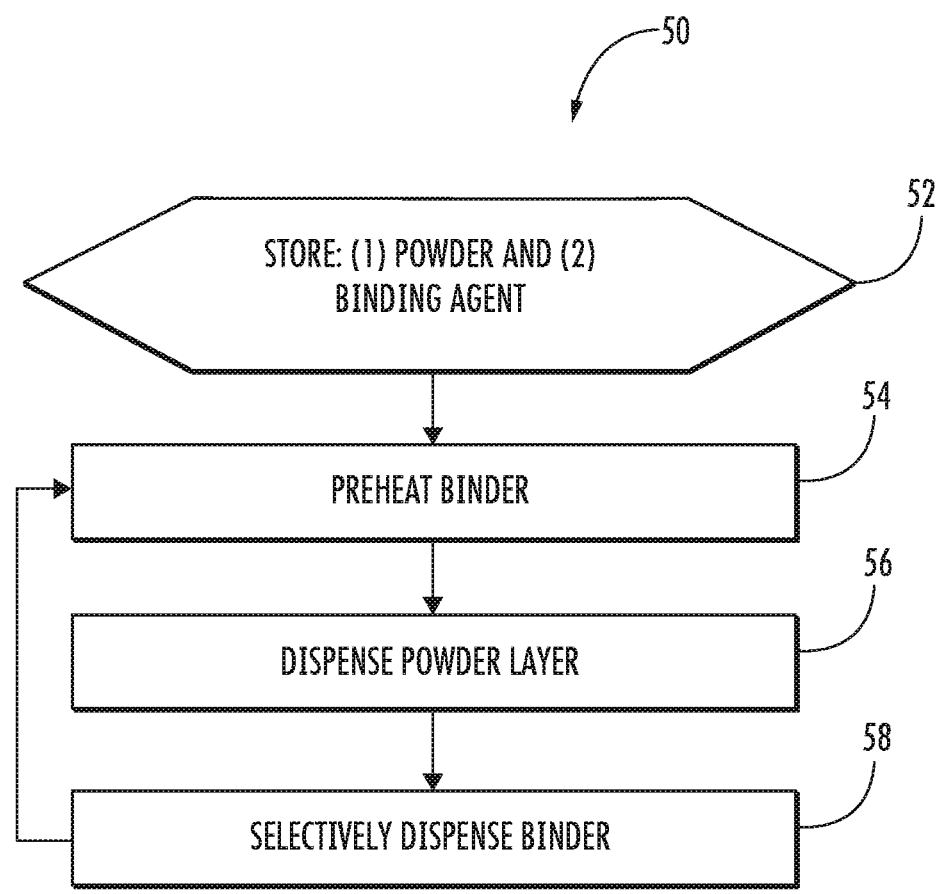
FIG. 3 is a flowchart depicting an embodiment of a method for forming a three-dimensional article using a powder and binding agent.

FIG. 3 is a flowchart depicting an embodiment of a method 50 for forming an article 4 such as an edible article 4. According to 52, the system 2 is in an initial state with the powder supply 14 containing a powder and the fluid supply 18 containing a binding agent.

According to 54, the binding agent is preheated in the fluid supply 18 and/or the printhead 20 before drop ejection. In one embodiment, the binding agent can be preheated to an operating temperature in a range of 25 degrees Celsius to about 40 degrees Celsius. In a more particular embodiment, the binding agent can be preheated to a range of about 29 degrees Celsius to about 35 degrees Celsius.

According to 56, a layer of powder is dispensed onto the upper surface 12. The result is a uniform layer of unbound powder.

According to 58, the printhead 20 is scanned over the layer of unbound powder. Ejectors 26 are energized in order to selectively dispense binding agent drops onto the unbound powder. The printing is performed in a "dot matrix" manner, in which pixels that correspond to a cross-sectional portion of the article 4 receive binding agent. For pixels that are not intended to be part of the article 4, the ejectors pass over the pixels without ejecting drops. Steps 54-58 are repeated to complete fabrication of the three-dimensional article 4 in a layer-by-layer manner.

In some embodiments of step 56, the printhead drop ejectors 26 can individually be operated at a frequency in a range of 15 to 40 KHz. In some embodiments of step 56, individually emitted drops can have a drop volume in a range of 15 to 25 picoliters.

FIG. 4 is a graphical representation of an "operating window" 60 for printing binding agents which is represented as a clear or white rectangle inside non-operating region 62. Non-operating region 62 is represented as a hatched periphery. A horizontal axis represents operating temperature. The vertical axis represents fluid viscosity and drive voltage, because these correlate with each other. For illustrative simplicity certain correlations are shown as linear but it is understood that some of these relationships are non-linear or may be plotted on a log scale. The purpose of FIG. 4 is to show general trends whereby the more complicated functional variation is not necessary to explain the reasoning.

Line or curve 64 plots meniscus evaporation versus operating temperature. Meniscus evaporation refers to evaporation at an air to liquid interface of nozzle 36 (FIG. 2). Such evaporation causes non-evaporative components of the bonder to concentrate at the nozzle 36. This can cause the nozzle to "skin over" or form a plug that can impede or block ejection of binding agent droplets from nozzle 36.

Line or curve 66 plots a required drive voltage versus operating temperature. As the temperature increases, the viscosity drops as indicated by the line or curve 68. This reduces the required drive voltage which is the voltage required to drive the piezoelectric element 32 to cause drops to eject from nozzle 36. It is desirable to minimize the drive voltage from a design and printhead life standpoint.

The circles labeled 1, 2, 4, and 5 indicate subregions of the region 62 that are not optimal for operation. In subregion 1, the fluid viscosity is too high. In this region, a very high drive voltage is required to eject drops from nozzle 36 because the binding agent does not respond efficiently to deflection of membrane 34. Higher voltages make design of printhead 20 more difficult and will shorten printhead life thus increasing the capital and operating cost of system 2.

In subregion 2 the operating temperature is too high. Rapid evaporation at the air/liquid interface of nozzle 36 results in difficulties in ejecting drops of binding agent. A plug in nozzle 36 may cause printhead 20 to stop functioning.

In subregions 4 and 5, the fluid viscosity is too low. At a low fluid viscosity, the drop ejection characteristics of printhead 20 are unstable because the fluid does not carry pressure waves in a stable manner.

Subregion 3 is an optimal operating window 60 for ejection of the edible binding agent. The viscosity in subregion 3 allows for a reasonable ejection voltage and for stable operation. At the same time, the temperature is in a range in which evaporation at the air/liquid interface of nozzle 36 is acceptable. The ranges cited supra for temperature and viscosity are within the operating window 60.

Figure 5:
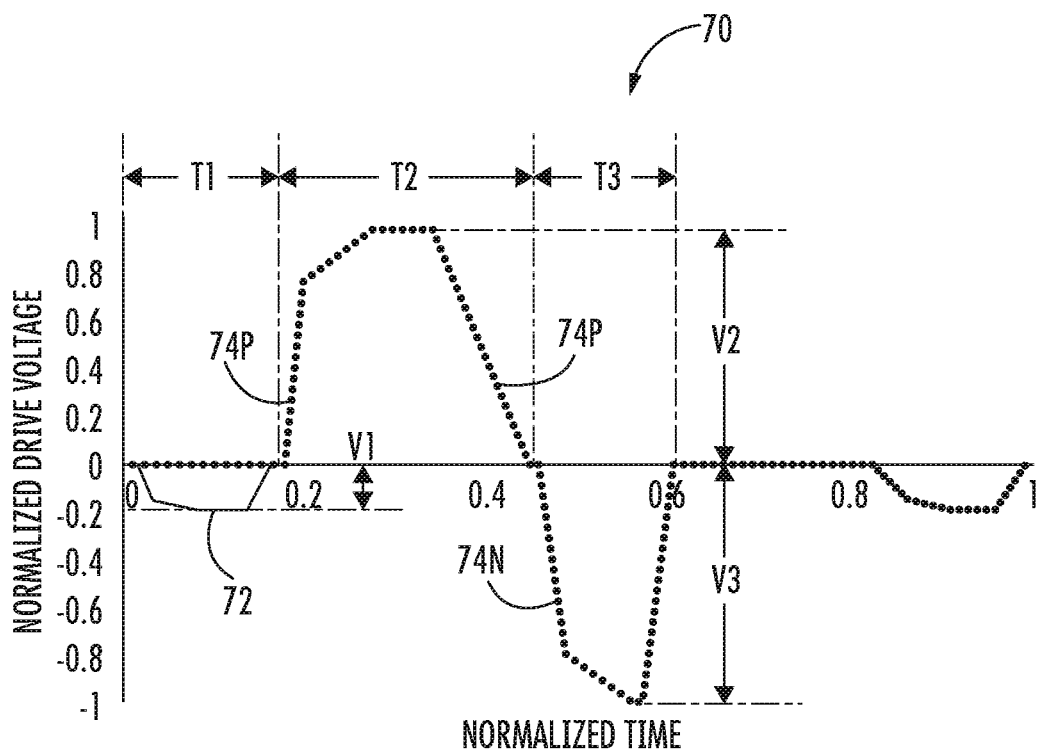
FIG. 5 is a normalized graph of drive voltage versus time for a waveform.
Figure 6:
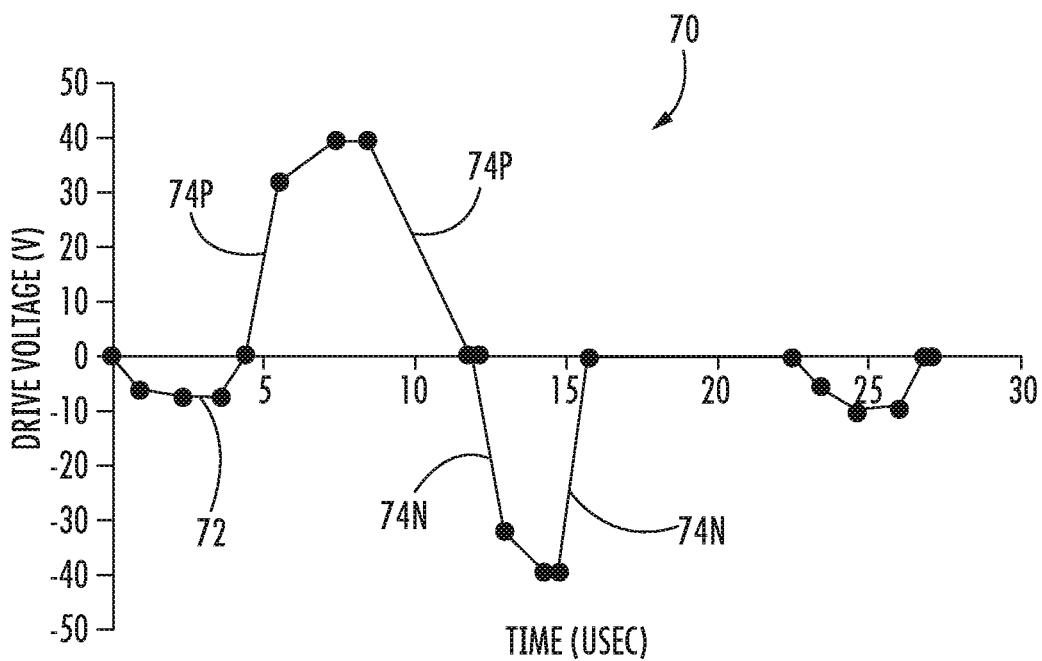
FIG. 6 is a graph of drive voltage versus time for a waveform.

FIGS. 5 and 6 are graphs of drive voltage versus time. FIG. 5 is a "normalized" graph and FIG. 6 utilizes the actual values. The graphs of FIGS. 5 and 6 depict an embodiment of a "waveform" 70 used to maintain or drive a drop ejector 26.

Waveform 70 can include one or a plurality portions including one or more of a non-ejecting pulse 72, and an ejecting pulse 74. The ejecting pulse 74 can be further divided into a positive pulse 74P and a negative pulse 74N. The non-ejecting pulse 72 has a peak voltage magnitude of V1 and a duration of $T_i$. The positive pulse 74P has a peak voltage magnitude of V2 and a duration of T2. The negative pulse 74N has a peak voltage magnitude of V3 and a duration of T3.

In the illustrated embodiment, the peak voltages V2 and V3 are approximately equal and individually more than three times V1. More particularly, V2 and V3 are individually about four or five times V1. V1 can be about 10 volts. V2 and V3 (magnitude) can be between about 40 and 50 volts.

In the illustrated embodiment, pulse 72 has a negative polarity, pulse 74P has a positive polarity, and pulse 74N has a negative polarity. In alternative embodiments, the polarity of pulse 72 can be positive.

In the illustrated embodiment, a sum of T2+T3 (the duration of the ejecting pulse 74) is about two times T1 (the duration of the non-ejecting pulse). T1 can be just under 5 microseconds (5 millionths of a second) or in a range between four and five microseconds. T2+T3 can be just over 10 microseconds or in a range between 10 and 12 microseconds.

A solid line of FIG. 5 depicts the waveform 70 for a drop ejector 26 that is not ejecting a drop. The non-ejecting pulse 72 is shown as a solid line to indicate that the voltage is being applied. Non-ejecting pulse 72 is used to maintain a drop ejector 26 that is not being operated. The dashed line 74 is indicative of an ejecting pulse 74 that is not activated—no voltage is being applied. Thus the solid line waveform 70 of FIG. 5 will not eject a pulse but will prevent the drop ejector 26 from being clogged by a plug in the nozzle 36. The non-ejecting waveform 70 of FIG. 5 can be utilized as the nozzle 36 is passing over pixel locations in a powder layer that are not to receive the binding agent.

FIG. 6 depicts the waveform 70 with both the non-ejecting pulse 72 and the ejecting pulse 74 being activated. The overall waveform 70 in FIG. 6 will eject a drop from nozzle 36. The ejecting waveform of FIG. 6 can be utilized as the nozzle 36 is passing over pixel locations in a powder layer that are to receive the binding agent.

During the first part of positive pulse 74P, pressure chamber 30 is expanded and fills with binding agent. Then, during a second part of positive pulse 74P and negative pulse 74N, the pressure chamber is contracted and a drop of binding agent is ejected from the nozzle 36. During a final part of the negative pulse 74N, the pressure chamber rebounds and refills with binding agent.

In an illustrative or preferred embodiment, the drop ejector 26 is operated in one of two modes including a non-ejecting mode and alternatively an ejecting mode. When the drop ejector is to pass over pixels that are not to receive the binding agent, the drop ejector 26 is operated in the non-ejecting mode and no drops are ejected. The non-ejecting mode includes a waveform 70 with a non-ejecting pulse 72 but not an ejecting pulse 74.

When the drop generator 26 is to pass over pixels that are to receive binding agent, the drop ejector is operated in the ejecting mode and drops are ejected onto those pixels. In one embodiment, the ejecting mode does not include the non-ejecting pulse 72 but does include the ejecting pulse 74.

In an alternative embodiment, a drop-ejecting mode can include a waveform 70 that includes both pulses 72 and 74 as illustrated in FIG. 6. Pulse 72 can be referred to as a "smaller" pulse and pulse 74 can be referred to as a "larger" pulse. Temporally, the smaller pulse 72 can either precede or follow the larger pulse 74 as part of the waveform 70.

It is important to operate the drop ejectors 26 in either the ejecting mode or non-ejecting mode to prevent clogging or plugging of the nozzles 36. An idle time period $T_i$ is defined as a time during which a drop ejector 26 does not receive any part of a waveform 70. During an idle time period $T_i$, a drop ejector does not receive either of a non-ejecting pulse 72 nor an ejecting pulse 74. During operation of system 2, it is important that $T_i$ for any drop generator 26 is less than 180 seconds to prevent clogging. Preferably $T_i$ is less than 120 seconds. Yet more preferably, $T_i$ is less than 60 seconds. To maximize reliability, $T_i$ is no more than 30 seconds.

The specific embodiments and applications thereof described above are for illustrative purposes only and do not preclude modifications and variations encompassed by the scope of the following claims.

What is claimed:

1. A system for fabricating a three-dimensional article comprising:
   a fluid supply for containing a binding agent;
   a drop-on-demand fluid-jetting piezoelectric printhead configured to receive the binding agent from the fluid supply;
   a dispenser for dispensing layers of a powder; and
   a controller configured to:
      operate the fluid supply and/or the drop-on-demand fluid-jetting piezoelectric printhead to elevate a temperature of the binding agent to above 25 degrees Celsius;
      operate the dispenser to dispose a layer of the powder at a build plane;
      scan and operate the drop-on-demand fluid-jetting piezoelectric printhead to selectively jet the binding agent onto the layer of the powder to bind a layer of the three-dimensional article, selectively jetting the binding agent includes individually operating drop ejectors of the drop-on-demand fluid-jetting piezoelectric printhead using a plurality of voltage waveforms including non-ejecting pulses and ejecting pulses wherein:
         the non-ejecting pulses individually having a peak voltage of magnitude V1 and duration T1; and
         the ejecting pulses individually having at least two sequential pulses including:
            a positive pulse having a peak voltage of magnitude V2 and duration T2, V2 is more than three times V1; and
            a negative pulse having a peak voltage of magnitude V3 and duration T3, V3 is more than three times V1; and
      repeat operating the dispenser and scanning and operating the drop-on-demand fluid-jetting piezoelectric printhead to complete fabrication of the three-dimensional article.

2. The system of claim 1 wherein the controller is configured to maintain the temperature of the binding agent within a range of 25 to 35 degrees Celsius before drop ejection.

3. The system of claim 1 wherein a drop is ejected through a nozzle having a diameter in a range of 30 to 50 microns in diameter.

4. The system of claim 1 wherein an ejected drop has a drop volume within a range of 15 to 25 picoliters.

5. The system of claim 1 wherein the non-ejecting pulses have a negative polarity, the positive pulse has a positive polarity, and the negative pulse has a negative polarity.

6. The system of claim 1 wherein V1 is within a range of 8 to 12 volts.

7. The system of claim 1 wherein V2 is within a range of 30 to 50 volts.

8. The system of claim 1 wherein V3 is within a range of 30 to 50 volts.

9. The system of claim 1 wherein the ejecting pulses have a duration of at least twice the duration of the non-ejecting pulses.

10. The system of claim 1 wherein T2>T3.

11. The system of claim 1 wherein the plurality of voltage waveforms individually have two different modes including:
    a non-ejecting mode waveform including the non-ejecting pulses but not the ejecting pulses; and
    an ejecting mode waveform including the ejecting pulses but not the non-ejecting pulses.

12. The system of claim 1 wherein the ejecting pulses individually include a third pulse having a peak voltage magnitude in a range of 8 to 12 volts.

13. A method of fabricating a three-dimensional article comprising:
    preheating a binding agent to at least 25 degrees Celsius;
    depositing a layer of powder upon a surface;
    scanning a piezoelectric printhead over the layer of the powder;
    concurrent with scanning the piezoelectric printhead, individually applying a plurality of voltage waveforms to individual drop ejectors to selectively eject drops of the binding agent, as preheated, onto the layer of the powder, the plurality of voltage waveforms including non-ejecting pulses and ejecting pulses wherein:
       the non-ejecting pulses individually having a peak voltage of magnitude V1 and duration T1; and
       the ejecting pulses individually having at least two sequential pulses including:
          a positive pulse having a peak voltage of magnitude V2 and duration T2, V2 is more than three times V1; and
          a negative pulse having a peak voltage of magnitude V3 and duration T3, V3 is more than three times V1; and
    repeating deposition of the powder and scanning and operating the piezoelectric printhead to complete fabrication of the three-dimensional article.

14. The method of claim 13 wherein the binding agent is preheated to within a temperature range of 25 to 35 degrees Celsius.

15. The method of claim 13 wherein a drop volume is within a range of 15 to 25 picoliters.

16. The method of claim 13 wherein the non-ejecting pulses have a negative polarity, the positive pulse has a positive polarity, and the negative pulse has a negative polarity.

17. The method of claim 13 wherein V1 is within a range of 8 to 12 volts.

18. The method of claim 13 wherein V2 is within a range of 30 to 50 volts.

19. The method of claim 13 wherein V3 is within a range of 30 to 50 volts.

20. The method of claim 13 wherein the plurality of voltage waveforms individually have one of two modes including a non-ejecting mode and an ejecting mode and wherein:
    a waveform of the non-jecting mode includes the non-ejecting pulses but not the ejecting pulses; and
    a waveform of the ejecting mode includes the ejecting pulses but not the non-jecting pulses.

* * * * *